United States Patent [19]

Mardis et al.

[11] 4,391,637

[45] Jul. 5, 1983

[54] RHEOLOGICAL ADDITIVE FOR NON-AQUEOUS FLUID SYSTEMS

[75] Inventors: Wilbur S. Mardis, Trenton, N.J.; Claude M. Finlayson, Houston, Tex.

[73] Assignee: NL Industries, Inc., New York, N.Y.

[21] Appl. No.: 313,031

[22] Filed: Oct. 19, 1981

[51] Int. Cl.$^3$ .................. C09D 11/00; C08L 91/06; C07F 5/06

[52] U.S. Cl. ........................ 106/20; 106/27; 106/271; 524/236

[58] Field of Search ............... 109/171; 260/448 C; 252/28, 316; 106/20, 27, 271; 524/236

[56] References Cited

U.S. PATENT DOCUMENTS

| | | | |
|---|---|---|---|
| 2,355,356 | 8/1944 | Young | 260/583 |
| 2,531,427 | 11/1950 | Hauser | 260/448 C |
| 2,531,440 | 11/1950 | Jordan | 252/28 |
| 2,548,679 | 4/1951 | Olin | 260/567.6 |
| 2,739,067 | 3/1956 | Ratcliff | 106/30 |
| 2,750,296 | 6/1956 | Curado | 106/30 |
| 2,754,219 | 7/1956 | Voet et al. | 106/32 |
| 2,775,617 | 12/1956 | Shapiro | 260/567.6 |
| 2,885,360 | 5/1959 | Haden et al. | 252/28 |
| 2,966,506 | 12/1960 | Jordan | 260/448 C |
| 3,136,819 | 6/1964 | Shapiro et al. | 260/583 |
| 3,461,163 | 8/1969 | Booth | 260/576.6 |
| 3,472,740 | 3/1967 | Booth | 203/37 |
| 3,537,994 | 11/1970 | House | 252/13 |
| 3,929,849 | 12/1975 | Oswald | 260/448 C |
| 3,945,836 | 3/1976 | Miyata | 106/22 |
| 4,097,437 | 6/1978 | Dhake | |
| 4,193,806 | 3/1980 | Finlayson | 106/20 |
| 4,208,218 | 6/1980 | Finlayson | 106/287.25 |
| 4,317,737 | 3/1982 | Oswald | 252/28 |

FOREIGN PATENT DOCUMENTS 1592271 7/1981 United Kingdom .

Primary Examiner—Theodore Morris

[57] ABSTRACT

A self-activating organophilic clay gellant having enhanced dispersibility in non-aqueous fluid systems comprising the reaction product of a smectite-type clay and an organic cationic compound having at least one long chain alkyl group and at least one long chain alkyl group and at least one group selected from a $\beta$, $\gamma$-unsaturated alkyl group or a hydroxyalkyl group having 2 to 6 carbon atoms.

13 Claims, No Drawings

RHEOLOGICAL ADDITIVE FOR NON-AQUEOUS FLUID SYSTEMS

This invention relates to the suspension of pigments and other particles in non-aqueous fluid systems. Non-aqueous fluid system broadly may be more particularly characterized as including lubricating greases, oil base muds, oil base packer fluids, paint-varnish-lacquer removers, paints, varnish, enamels, waxes, epoxies, foundry molding sand binders, adhesives and sealants, inks, polyester laminating resins, polyester gel coats, and the like.

These fluid systems often contain finely divided suspended materials, such as pigments and the like. The rheological agent is added to thicken the system to produce a thixotropic flow behavior with high viscosity at a low shear rate. Various organically modified clays and other inorganic and organic compounds have been used in the past to produce these rehological effects.

Previously available rheological-property-modifying and suspending agents have possessed various defects which are overcome by the agents of this invention. Thus, aluminum stearate is notably deficient in its ability to maintain pigments in suspension in most organic vehicles and in the ease with which pigments can be redispersed after settling from such suspensions during long periods of ageing. The gel produced by the incorporation of aluminum stearate in organic vehicles is of a rubbery type, rather than the desirable thixotropic type of gel which is effective in maintaining stable suspensions. The presence of aluminum stearate in pigment suspensions, such as paints, has no beneficial effect on the brushability properties of such suspensions. Organic derivatives of montmorillonite have also been used as suspending agents. However, such derivatives are generally effective only in the presence of aromatic and polar solvents and, consequently, are inefficient when incorporated in the presently favored odorless, aliphatic hydrocarbon vehicles.

In particular, the organophilic clays which have been used by the prior art require the use of polar solvent activators which must be added to the system to produce the rheological effect. If the polar solvent activators are not used, the desired rheological properties, viscosity build, pigment settling control, and sag control are not fully achieved, that is, only a portion of the clay's thickening ability is obtained. In addition, when the polar solvent activators are eliminated, the compositions containing organoclays known to date will increase in viscosity on storage, thus having a deleterious effect on the original rheological properties designed into the system.

Some of these polar additives, such as acetone, alcohols and the like have low flash points and therefore should be avoided if possible. In addition, these polar additives must be added as a separate step at the time of preparing the systems. This separate step adds to the cost of the system. In addition, some polar additives may react with other system formulation components and eliminate essential rheological properties.

Hydrogenated castor oil is a much more efficient suspending agent that the indicated montmorillonite derivatives, and is suitable for use in aliphatic hydrocarbon vehicles. However, hydrogenated castor oil has the disadvantage of being unstable at the elevated temperatures used in the processing of suspensions, e.g., in paint mills, with the result that there is seeding or the formation of small grains in such suspensions; this lack of smoothness is highly undesirable in most suspensions, including those used in the protective coating and ink fields. Polyethylene has also been tried as a suspending agent, but it, too, has its drawbacks in this regard. For example, paints containing polyethylene as a suspending agent are characterized by settling of the pigment contained therein within a few days, have poor anti-sag properties, and display little or no puff during the initial milling of the paint constituents or thereafter; "puff" refers to the desirable blown-up appearance of paint indicative of a good dispersion, and resembling whipped cream in appearance. It is thus evident that no prior art rheological agent has been completely satisfactory or effective for a wide variety of non-aqueous fluid systems.

In contrast to the prior art systems, an organophilic clay rheological additive has been produced by the instant invention which does not require the addition of a polar solvent activator while maintaining a broad range of gelling utilities in the absence of fluctuating dispersion and viscosity properties. The particular rheological additives disclosed herein are defined in more detail in applicants copending application Ser. No. 313,034 filed simultaneously with the instant application.

A self-activating organophilic clay gellant having enhanced dispersibility in non-aqueous fluid systems has been prepared comprising the reaction product of a smectite-type clay and an organic cationic compound having at least one long chain alkyl group and at least one group selected from a $\beta,\gamma$-unsaturated alkyl group or a hydroxyalkyl group having 2 to 6 carbon atoms.

In particular, an organophilic clay gellant is described which comprises the reaction product of an organic cationic compound and a smectite-type clay having a cation exchange capacity of at least 75 milliequivalents per 100 grams of said clay, wherein said organic cationic compound contains (a) a first member selected from the group consisting of a $\beta,\gamma$-unsaturated alkyl group and a hydroxyalkyl group having 2 to 6 carbon atoms and mixtures thereof, (b) a second member comprising a long chain alkyl group having 12 to 60 carbon atoms and (c) a third and fourth member selected from a member of group (a) above, an aralkyl group, and an alkyl group having 1 to 22 carbon atoms and mixtures thereof; and wherein the amount of said organic cationic compound is from 90 to 140 milliequivalents per 100 grams of said clay, 100% active clay basis.

The clays used to prepare the organophilic clay gellants of this invention are smectite-type clays which have a cation exchange capacity of at least 75 milliequivalents per 100 grams of clay. Particularly desirable types of clay are the naturally-occurring Wyoming variety of swelling bentonite and like clays, and hectorite a swelling magnesium-lithium silicate clay.

The cation exchange capacity of the smectite-type clays can be determined by the well-known ammonium acetate method.

The clays, especially the bentonite type clays, are preferably converted to the sodium form if they are not already in this form. This can conveniently be done by preparing an aqueous clay slurry and passing the slurry through a bed of cation exchange resin in the sodium form. Alternatively, the clay can be mixed with water and a soluble sodium compound such as sodium carbonate, sodium hydroxide and the like, followed by shearing the mixture with a pugmill or extruder.

Smectite-type clays prepared naturally or synthetically by either a pneumatolytic or, preferably a hydrothermal synthesis process can also be used to prepare the present organophilic clays. Representative of such clays are montmorillonite, bentonite, beidellite, hectorite, saponite, and stevensite. Synthetic clays may be synthesized hydrothermally by forming an aqueous reaction mixture in the form of a slurry containing mixed hydrous oxides or hydroxides of the desired metal with or without, as the case may be, sodium (or alternate exchangeable cation or mixture thereof) fluoride in the proportions for the particular synthetic smectite desired. The slurry is then placed in an autoclave and heated under autogenous pressure to a temperature within the range of approximately 100° to 325° C., preferably 274° to 300° C., for a sufficient period of time to form the desired product.

The organic cationic compounds which are useful in this invention may be selected from a wide range of materials that are capable of forming an organophilic clay by exchange of cations with the smectite-type clay. The organic cationic compound must have a positive charge localized on a single atom or on a small group of atoms within the compound. Preferably the organic cation is selected from the group consisting of quarternary ammonium salts, phosphonium salts, and mixtures thereof, as well as equivalent salts, and wherein the organic cation contains at least one member selected from (a) a $\beta$, $\gamma$-unsaturated alkyl group and/or a hydroxyalkyl group having 2 to 6 carbon atoms and (b) a long chain alkyl group. The remaining moieties on the central positive atom are chosen from a member from group (a) above or an aralkyl group and/or an alkyl group having from 1 to 22 carbon atoms.

The $\beta$, $\gamma$-unsaturated alkyl group may be selected from a wide range of materials. These compounds may be cyclic or acylic, unsubstituted or substituted with aliphatic radicals containing up to 3 carbon atoms such that the total number of aliphatic carbons in the $\beta$, $\gamma$-unsaturated radical is 6 or less. The $\beta$, $\gamma$-unsaturated alkyl radical may be substituted with an aromatic ring that likewise is conjugated with the unsaturation of the $\beta$, $\gamma$ moiety or the $\beta$, $\gamma$-radical is substituted with both an aliphatic radical and an aromatic ring.

Representative examples of cyclic $\beta$, $\gamma$-unsaturated alkyl groups include 2-cyclohexenyl and 2-cyclopentenyl. Representative examples of acyclic $\beta$, $\gamma$-unsaturated alkyl groups containing 6 or less carbon atoms include propargyl, allyl (2-propenyl); crotyl (2-butenyl); 2-pentenyl; 2-hexenyl; 3-methyl-2-butenyl; 3-methyl-2-pentenyl; 2,3-dimethyl-2-butenyl; 1,1-dimethyl-2-propenyl; 1,2-dimethyl-2-propenyl; 2,4-pentadienyl; and 2,4-hexadienyl. Representative examples of acyclic-aromatic substituted compounds include cinnamyl (3-phenyl-2-propenyl); 2-phenyl-2-propenyl; and 3-(-4-methoxyphenyl)-2-propenyl. Representative examples of aromatic and aliphatic substituted materials include 3-phenyl-2-cyclohexenyl; 3-phenyl-2-cyclopentenyl; 1,1-dimethyl-3-phenyl-2-propenyl; 1,1,2-trimethyl-3-phenyl-2-propenyl; 2,3-dimethyl-3-phenyl-2-propenyl; 3,3-dimethyl-2-phenyl- 2-propenyl; and 3-phenyl-2-butenyl.

The hydroxyalkyl group is selected from a hydroxyl substituted aliphatic radical wherein the hydroxyl is not substituted at the carbon adjacent to the positively charged atom, and has from 2 to 6 aliphatic carbons.

The alkyl group may be substituted with an aromatic ring. Representative examples include 2-hydroxyethyl (ethanol); 3-hydroxypropyl; 4-hydroxypentyl; 6-hydroxyhexyl; 2-hydroxypropyl (isopropanol); 2-hydroxybutyl; 2-hydroxypentyl; 2-hydroxyhexyl; 2-hydroxycyclohexyl; 3-hydroxycyclohexyl; 4-hydroxycyclohexyl; 2-hydroxycyclopentyl; 3-hydroxycyclopentyl; 2-methyl-2-hydroxypropyl; 1,1,2-trimethyl-2-hydroxypropyl; 2-phenyl-2-hydroxyethyl; 3-methyl-2-hydroxybutyl; and 5-hydroxy-2-pentenyl.

The long chain alkyl radicals may be branched or unbranched, saturated or unsaturated, substituted or unsubstituted and should have from 12 to 60 carbon atoms in the straight chain portion of the radical.

The long chain alkyl radicals may be derived from natural occurring oils including various vegetable oils, such as corn oil, coconut oil, soybean oil, cottonseed oil, castor oil and the like, as well as various animal oils or fats such as tallow oil. The alkyl radicals may likewise be petrochemically derived such as from alpha olefins.

Representative examples of useful branched, saturated radicals include 12-methylstearyl; and 12-ethylstearyl. Representative examples of useful branched, unsaturated radicals include 12-methyloleyl and 12-ethyloleyl. Representative examples of unbranched saturated radicals include lauryl; stearyl; tridecyl; myristal (tetradecyl); pentadecyl; hexadecyl; hydrogenated tallow, docosonyl. Representative examples of unbranched, unsaturated and unsubstituted radicals include oleyl, linoleyl; linolenyl, soya and tallow.

The remaining groups on the positively charged atom are chosen from (a) a member of the group selected from a $\beta$, $\gamma$-unsaturated alkyl group and a hydroxyalkyl group having 2 to 6 carbon atoms, both described above; (b) an alkyl group having 1 to 22 carbon atoms, cyclic and acyclic and (c) an aralkyl group, that is benzyl and substituted benzyl moieties including fused ring moieties having lineal or branched 1 to 22 carbon atoms in the alkyl portion of the structure.

Representative examples of an aralkyl group, that is, benzyl and substituted benzyl moieties would include benzyl and those materials derived from, e.g. benzyl halides, benzhydryl halides, trityl halides, 1-halo-1 phenylalkanes wherein the alkyl chain has from 1 to 22 carbon atoms such as 1-halo-1-phenylethane; 1-halo-1-phenyl propane; and 1-halo-1-phenyloctadecane; substituted benzyl moieties such as would be derived from ortho-, meta- and para-chlorobenzyl halides, para-methoxybenzyl halides; ortho-, meta- and para-nitrilobenzyl halides, and ortho-, meta- and para-alkylbenzyl halides wherein the alkyl chain contains from 1 to 22 carbon atoms; and fused ring benzyl-type moieties such as would be derived from 2-halomethylnaphthalene, 9-halomethylanthracene and 9-halomethylphenanthrene, wherein the halo group would be defined as chloro, bromo, iodo, or any other such group which serves as a leaving group in the nucleophilic attack of the benzyl type moiety such that the nucleophile replaces the leaving group on the benzyl type moiety.

Representative examples of useful alkyl groups which may be lineal and branched, cyclic and acyclic include methyl; ethyl; propyl; 2-propyl; iso-butyl; cyclopentyl; and cyclohexyl.

The alkyl radicals may also be derived from other natural oils, both substituted and unsubstituted such as those described above, including various vegetable oils, such as tallow oil, corn oil, soybean oil, cottonseed oil, castor oil, and the like, as well as various animal oils and fats.

Many processes are known to prepare organic cationic salts. For example, when preparing a quaternary ammonium salt one skilled in the art would prepare a dialkyl secondary amine, for example, by the hydrogenation of nitriles, see U.S. Pat. No. 2,355,356; and then form the methyl dialkyl tertiary amine by reductive alkylation using formaldehyde as the source of methyl radical. Also see Shapiro et al. U.S. Pat. No. 3,136,819 for forming the quaternary amine halide by adding benzyl chloride or benzyl bromide to the tertiary amine as well as Shapiro et al. U.S. Pat. No. 2,775,617.

The salt anion is preferably selected from the group consisting of chloride and bromide, and mixtures thereof, and is more preferably chloride, although other anions such as acetate, hydroxide, nitrite, etc., may be present in the organic cationic compound to neutralize the cation. A representative formula being

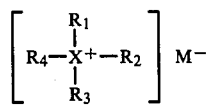

wherein $R_1$ is selected from the group consisting of a $\beta,\gamma$-unsaturated alkyl group and hydroxyalkyl group having 2 to 6 carbon atoms; $R_2$ is a long chain alkyl group having 12 to 60 carbon atoms; $R_3$ and $R_4$ are selected from a group consisting of an $R_1$ group, an aralkyl group, and alkyl group having from 1 to 22 carbon atoms; X is phosphorous or nitrogen; and where $M^-$ is selected from the group consisting of $Cl^-$, $Br^-$, $I^-$, $NO_2^-$, $OH^-$ and $C_2H_3O_2^-$.

The organophilic clays of this invention can be prepared by admixing the clay, quaternary ammonium compound and water together, preferably at a temperature within the range from 20° C. to 100° C., and most preferably from 35° C. to 77° C. for a period of time sufficient for the organic compound to coat the clay particles, followed by filtering, washing, drying and grinding. In using the organophilic clays in emulsions, the drying and grinding steps may be eliminated. When admixing the clay, quaternary ammonium compound and water together in such concentrations that a slurry is not formed, then the filtration and washing steps can be eliminated.

The clay is preferably dispersed in water at a concentration from about 1 to 80% and preferably 2% to 7%, the slurry optionally centrifuged to remove non-clay impurities which constitute about 10% of the starting clay composition, the slurry agitated and heated to a temperature in the range from 35° C. to 77° C. The quaternary amine salt is then added in the desired milliequivalent ratio, preferably as a liquid in isopropanol or dispersed in water and the agitation continued to effect the reaction.

For convenience of handling it is preferred that the total organic content of the organophilic clay reaction products of this invention should be less than about 50% by weight of the organoclay. While higher amounts are usable the reaction product is difficult to filter, dry and grind.

The amount of organic cation added to the clay for purposes of this invention must be sufficient to impart to the clay the enhanced dispersion characteristic desired. This amount is defined as the milliequivalent ratio which is the number of milliequivalents (M.E.) of the organic cation in the organoclay per 100 grams of clay, 100% active clay basis. The organophilic clays of this invention must have a milliequivalent ratio from 90 to 140 and preferably 100 to 130. At lower milliequivalent ratios the organophilic clays produced are not effective gellants even though they may be good gellants when dispersed in a conventional manner with polar organic dispersants. At higher milliequivalent ratios the organophilic clays are poor gellants. However, it will be recognized that the preferred milliequivalent ratio within the range from 90 to 140, will vary depending on the characteristics of the organic system to be gelled by the organophilic clay.

The manner in which the organic cation functions in the organophilic clay reaction products of this invention is not fully known. The unique properties associated with the compositions of this invention are believed however to relate to the electron withdrawing and donating portions of the cation and particularly to the essential presence of at least one long chain alkyl group coupled with a $\beta$, $\gamma$-unsaturated alkyl group and/or the hydroxyalkyl group. When bonded to a positively charged atom the long chain alkyl group appears to function as an electron donator which aids in delocalizing the positive charge. More importantly however it enables the clay platelets to be separated sufficiently to allow further separation under moderate shear conditions. In contrast, the $\beta$, $\gamma$-unsaturated alkyl group appears to create a delocalization of the positive charge which may result from a resonance and/or inductive effect occurring with the unsaturated alkyl group. This effect does not occur to any significant extent with other prior art saturated alkyl groups. The enhanced function of the short chain hydroxyalkyl group appears to be related to the internal covalent bonded polar activating moiety, namely the hydroxyl group when not adjacent the positively charged atom. This effect is negated when the hydroxyl moiety is located on a carbon atom adjacent to the positively charged atom or on an alkyl aliphatic carbon greater than 6 carbon atoms long.

The compositions of the invention as discussed above find wide utility as rheological additives in non-aqueous fluid systems generally. The non-aqueous fluid compositions in which the self activating organophilic clays are useful include paints, varnishes, enamels, waxes, epoxies, mastics, adhesives, cosmetics, inks, polyester laminating resins, polyester gel coats, and the like. These fluids may be prepared by any conventional method such as described in U.S. Pat. No. 4,208,218 including colloid mills, roller mills, ball mills, and high speed dispersers, in which the pigment materials become well dispersed in the organic vehicle by the high shear used in processing. While the instant invention has been defined with reference to non-aqueous fluids it is contemplated that such compositions may contain minor amounts of water in the non-aqueous fluid such as amounts up to 10% by weight and still fall within the scope of the invention.

The organophilic clay gellant is employed in such compositions in amounts sufficient to obtain the desired rheological properties such as high viscosity at low shear rates, control of sagging of fluid films and prevention of settling and hard packing of pigments present in the non-aqueous fluid compositions. Amounts of the organophilic clay gellant employed in the non-aqueous fluid system should preferably be between about 0.1% and about 15% based on the weight of the treated non-aqueous fluid system and preferably between 0.3% and 5.0% to yield the desired rheological effects.

The thickening agent of this invention are characterized by a number of advantages over previously available suspending agents. Such advantages are evidenced by enhanced performance properties exhibited by a multitude of specific species falling within the inventive generic compound description. Generally, the suspending agents of this invention do not grain, seed or undergo any other unfavorable changes at high processing or storage temperatures; they perform as effective gelling agents in the absence of solvent activators; they are effective in both aliphatic and aromatic vehicles as well as moderately polar vehicles; their use permits complete control of rheological properties and provides consistent results. In addition, depending on the product properties and end use applications desired, they are non-yellowing and can be used without fear of discoloration and they obtain impart degrees of suspension properties permitting excellent pigment suspension and antisag properties.

A specific embodiment of the present invention involves the formation of non-aqueous fluid systems comprising thixotropic coating compositions.

Coating compositions comprising a film forming organic and/or inorganic binder, solvents, and optionally pigments have been described heretofore for use as decorative and/or protective materials for e.g., metal, wood, plastics, and paper. In practice, these compositions are applied to the substrate with equipment such as a brush, a roller, air or airless atomization, or dipping. In these compositions, thixotropic gelling agents may be employed which provide low viscosity to the coating composition at high shear such as would be employed during the application of the coating but provide high viscosity under low or no shear conditions.

In the past, asbestos, fumed silica, various organic materials, and organophilic clays have been employed as efficient gelling agents for such coating compositions. However, these materials have suffered from varius disadvantages, such as creation of health hazards, high cost-performance levels and preparation of inadequate coating compositions lacking in gloss and surface smoothness.

The organophilic clays of this invention have been employed as effective gellants for coating compositions without the difficulties associated with the prior art materials. The organophilic clays may be dispersed in the coating compositions under low or optionally high shear conditions.

In a typical procedure, the organophilic clay gellant is added to a portion of a coating composition comprising a film forming organic binder, organic solvent, and optionally pigments under agitation of 5000 lineal feet per minute. The stirring rate is increased to 15,000 lineal feet per minute for 15 minutes to insure complete dispersion of the organophilic clay. Once dispersion is achieved the remaining amount of organic binder and solvent are added under low to moderate shear conditions to complete the formulation. While this typical manner of addition is acceptable for use with the novel compositions of this invention alternatively such compositions may be post added under low to moderate shear conditions to a previously prepared coating composition. This post addition method is quite unexpected and is not possible with conventional organophilic clay materials since they cannot achieve full viscosity levels and dispersion in the absence of high shear.

The film forming organic binders of this invention are prepared by conventional procedures such as polymerization of acrylate and methacrylate esters; from unsaturated polyester resins; and by reaction of drying oils such as linoleic acid with polymers containing hydroxyl functionality. Generally, organic binders having gram molecular weights of 200 to several hundred thousand are useful.

Organic solvents for such coatings may be broadly classified into five categories which include aliphatic, aromatic, moderately polar, polar and chlorinated solvent. Aliphatic solvents include normal and branched chain aliphatic hydrocarbons having from about 5 to 12 carbon atoms and cycloaliphatic compounds. Aromatic solvents include such materials as benzene, toluene, xylene and ethyl benzene. Moderately polar solvents include ketonic and ester solvents such as acetone, methyl ethyl ketone, methyl butyl ketone, methyl isobutyl ketone, cyclohexanone, ethyl acetate, butyl acetate, ethoxyethyl acetate, and the like. Polar solvents include such materials as low molecular weight alcohols such as methanol, ethanol, propanol, 2-propanol, butanol, 2-butanol, and ethoxyethanol. Chlorinated hydrocarbon solvents include such materials as methylene chloride, chloroform, carbon tetrachloride, chloroethane and 1,1,1-trichloroethane.

The coating compositions of this invention may contain conventional additives such as finely divided solid particles to be suspended by the agents of this invention. The particular additives to be employed, such as pigments, extenders, inerts, fillers, opaciforms and so forth are all well known in the art and do not constitute a part of this invention.

The amounts of organophilic clay gellant used in the coating compositions can range from 0.25% to 10%, and preferably 0.5% to 5% by weight. Amounts larger than 10% can be used but are difficult to handle because of high viscosities. The organic binder may be conveniently employed in amounts of 10% to 80% of the liquid portion of the coating composition. The organic solvent is employed in sufficient amounts to reduce the viscosity of the coating composition to usable levels depending on the method of application, but in any case to yield up to 100% of the total composition. Supplemental additives including pigments may be employed in quantities ranging from 0.5 to 50% of the total coating composition.

The particular rheological additive and quantity used to provide satisfactory performance in a given coating composition will vary upon several factors. In general, it has been found that acceptable performance in high-polarity solvent systems is achieved when using organophilic clay reaction products prepared from quaternary compounds containing two or three long chain alkyl groups. In contrast, quaternary compounds containing only one long chain alkyl group have been found acceptable for moderate to low polarity solvent systems. As such, the most appropriate organic rheological additive would be dependent on the required coatings rheology, solvent type, processing-temperature control and manufacturing equipment. While the effectiveness of a particular rheological additive will vary depending on these factors, the compositions disclosed herein have been found to provide superior performance over conventional additives. Unlike such prior art materials, the instant compositions do not require a heat treatment during processing, they are less sensitive to heat during application and storage, they do not require the essential presence of a polar activator and they provide excellent viscosity build, antisettling and sag resistance.

EXAMPLES

In order to more completely describe the present invention, the following examples are given. All percentages given are based upon weight unless otherwise indicated. The ingredients and amounts thereof used to prepare each coating composition are summarized in Table IA (Aliphatic Pigmented Solvent System), Table IIA (Aliphatic Clear Solvent System), Table IIIA (Aromatic Pigmented Solvent System), Table IVA (Aromatic Clear Solvent System), and Table VA (Moderately Polar Clear Solvent System).

The results in the tables show that the inventive compositions, when post-added to a previously prepared coating system at moderately low shear, impart superior viscosity and sag control to the system and disperse to almost the same level as conventionally employed materials when incorporated into the system at a significantly higher shear condition. Also, the comparative materials when incorporated into the system at lower shear condition are decidely inferior in dispersibility, viscosity build and sag resistant properties compared to the inventive material incorporated into the system at the same shear.

The organophilic clays of this invention having the composition as per the Tables were post-added under low shear conditions into the coating composition without a polar solvent activator. For comparison, various conventional organoclays were also post-added to the coating composition at the same shear condition as the test organophilic clay; however, in this case a mixture of 95% methanol and 5% water was used as a polar solvent activator for the organoclay.

Specifically, 600 grams of a previously prepared coating composition, not containing a rheological additive, was weighed into a derimmed circular quart can which measures 4 inches in diameter and 4⅝ inches in height. The system is agitated using a 1 HP Premier Dispersator equipped with a 1⅝ inch diameter saw tooth Cowles blade. The blade was positioned in th system at the center of the quart can at a height such that the bottom of the blade is ½ inch above the bottom surface of the can. The shaft speed is held constant at 3000 rpm. 5.1 grams of the organophilic clays of this invention are slowly sifted into the swirling system. In the case of the comparative materials 1.7 grams (2.1 cc) of a mixture of 95% methanol and 5% water is also added to the system exactly one minute after the addition of the organoclay is completed. This polar solvent activator is injected into the system using a 5 cc glass syringe.

The system plus organoclay plus activator, in the case of the comparative organophilic clay, is allowed to mix at a shaft speed of 3,000 rpm for a total of 15 minutes. At this time, without stopping the dispersator, a small aliquot of solution is withdrawn from the quart can using a tapered 5 inch stainless steel spatula. This aliquot is used to measure the fineness of dispersion of the solution. This measurement is made using a Hegman fineness of grind gauge rated in a scale that ranges from 0 to 8 where 0 is equal to a film thickness of 4 mils and 8 is equal to a film thickness of zero mils. The grind gauge is a stainless steel block into which a channel of varying depth has been cut out. The solution to be tested is placed into the channel at the deepest end and cast down the full length of the channel. The fineness of grind of the system is determined at the point along the channel depth at which the pigment particles are first visible above the surface of the solution film. This measurement was taken after 15 minutes mixing time. The systems are then transferred to a tin can and allowed to equilibrate overnight at 20° C. before being tested for viscosity and sag.

The ease of dispersion test is made as discussed above using a Brookfield RVT model viscometer equipped with a #4 spindle at a spindle speed of 10 rpm. The sag measurements are made with a Leneta anti-sag blade. The sag drawdowns are cast onto Leneta 7B charts with the aid of a mechanical drive film applicator equipped with a perforated vacuum plate. The completed drawdowns are placed in a vertical position with the paint stripes horizontal, the thinnest stripe at the top. The sag is read, after the film has dried, as the thickest stripe which does not sag sufficiently to cross into the next stripe below it. Sag units are in mils (0.001 inch).

In Table IB and IIB the data demonstrates the preparation of coating systems having an improved ease of dispersion and/or greater viscosity build at moderate shear conditions as compared with the conventional additives.

In Tables IIIB and IVB the data demonstrates a general increase in viscosity build, and generally improved antisag properties of the organophilic clays of this invention versus conventionally prepared additives.

In Table VB the data demonstrates essentially equivalent results to the prior art additives with a limited number having increased viscosity build for the organophilic clays of the invention.

TABLE IA

| | ALIPHATIC PIGMENTED SOLVENT SYSTEM | | | | |
|---|---|---|---|---|---|
| Ingredients | Generic Name | Manufacturer | Blank (No Thickener) Pounds | Control Normal Processing (High Shear) Pounds | Experimental Low Shear Processing (Post Addition) Pounds |
| MILLBASE | | | | | |
| Aroplaz 1266M70 | Long Oil Soya Alkyd Resin Solution (70% N.V.) | Spencer Kellogg Div. of Textron, Inc. | 66.1 | 66.1 | 66.1 |
| Mineral Spirits 663 | Aliphatic Hydrocarbon | Union Oil Company of California | 66.7 | 66.7 | 66.7 |
| Rheological Additive | Dimethyl di-hydrogenated tallow ammonium bentonite | NL Industries, Inc. | — | — | — |
| Methanol/Water, 95/5 | — | — | — | 3.3 | — |
| TITANOX 2020 | Titanium Dioxide Rutile | NL Industries, Inc. | 240.1 | 240.1 | 240.1 |
| Atomite | Calcium Carbonate Natural Ground | Thompson, Weinmann & Co. | 191.3 | 191.3 | 191.3 |

TABLE IA-continued

ALIPHATIC PIGMENTED SOLVENT SYSTEM

| Ingredients | Generic Name | Manufacturer | Blank (No Thickener) Pounds | Control Normal Processing (High Shear) Pounds | Experimental Low Shear Processing (Post Addition) Pounds |
|---|---|---|---|---|---|
| GRIND AT HIGH SPEED - 5400 RPM FOR 15 MINUTES | | | | | |
| LET DOWN - ADD IN ORDER LISTED WITH MIXING AT 2,000 RPM | | | | | |
| Aroplaz 1266 M70 | Long Oil Soya Alkyd Resin Solution (70% N.V.) | Spencer Kellogg Div. of Textron, Inc. | 241.4 | 241.4 | 241.4 |
| Aroflat 3113P0 | Thixotropic Alkyd | Spencer Kellogg | 191.3 | 191.3 | 191.3 |
| Mineral Spirits 663 | Aliphatic hydrocarbon | Union Oil Company of California | 46.8 | 46.8 | 46.8 |
| Paint Drier | 6% Cobalt Naphthenate | Tenneco Chemical, Inc. | 1.8 | 1.8 | 1.8 |
| Paint Drier | 4% Calcium Naphthenate | Tenneco Chemical, Inc. | 8.6 | 8.6 | 8.6 |
| Exkin #2 | Oxime Antiskin Agent | Tenneco Chemical, Inc. | 1.0 | 1.0 | 1.0 |
| | | MIX AT 3000 RPM | | | |
| Stir-In Thickener | Organophilic clay | Experimental | — | — | 10.0 |
| | | TOTALS | 1055.1 | 1068.4 | 1065.1 |

TABLE IB

| Example | Rheological Additive (ME Ratio) | Fineness of Grind | Viscosity (cPs) 24 hours | Sag (mils) 24 hours |
|---|---|---|---|---|
| Comparative A | Fumed silica | 0 | 800 | 4 |
| Comparative B | Benzyl trihydrogenated tallow ammonium bentonite (111.5) | 6 | 1250 | 6 |
| Comparative C | Benzyl trihydrogenated tallow ammonium bentonite (117.8) | 6 | 1300 | 6 |
| Comparative D | Methyl trihydrogenated tallow ammonium bentonite (110.8) | 2 | 1760 | 7 |
| Comparative E | Methyl trihydrogenated tallow ammonium bentonite (116) | 5 | 1650 | 7 |
| Comparative F | Dimethyl dihydrogenated tallow ammonium bentonite (110) | 0 | 480 | 3 |
| Inventive 1 | Allyl trihydrogenated tallow ammonium bentonite (110.8) | 5 | 1620 | 7 |
| Inventive 2 | Ethanol trihydrogenated tallow ammonium bentonite (111.8) | 0 | 1360 | 6 |
| Inventive 3 | Allyl benzyl dihydrogenated tallow ammonium bentonite (110) | 0 | 704 | 4 |
| Inventive 4 | Allyl ethanol dihydrogenated tallow ammonium bentonite (108.8) | 1 | 764 | 4 |
| Inventive 5 | Allyl methyl dihydrogenated tallow ammonium bentonite (119.8) | 1.5 | 1496 | 7 |
| Inventive 6 | Ethanol methyl dihydrogenated tallow ammonium bentonite (108.2) | 0 | 940 | 3 |

TABLE IIA

ALIPHATIC CLEAR SOLVENT SYSTEM

1. Add 388 grams of the Aroplaz 1266-M70 to an unlined 1 quart can.
2. Stir at 1000 rpm on a 1 hp dispersator with a 1⅝" Hi-Vis Blade.
3. Add 12g of the rheological additive while mixing.
4. Increase speed of mixer blade to 3000 rpm.
5. After 1 minute add 2 grams of ethylene glycol to the fumed silica sample only.
6. Check fineness of grind after 15 minutes mixing.
7. Transfer gel to an unlined 1 pint can.
8. Measure 10 rpm Brookfield viscosity within 5 minutes.
9. Recheck viscosity, the next day.

TABLE IIB

| Example | Rheological Additive (ME Ratio) | Fineness of grind | Viscosity (cPs) 24 hours | Sag (mils) 24 hours |
|---|---|---|---|---|
| Comparative G | None | — | 4540 | 4 |
| Comparative H | Fumed silica | 7.5 | 9900 | 4 |
| Comparative I | Dimethyl dihydrogenated tallow ammonium bentonite (95) | 0 | 5840 | — |
| Comparative J | Benzyl trihydrogenated tallow ammonium bentonite (111.5) | 0 | 14120 | 12 |
| Comparative K | Methyl trihydrogenated tallow ammonium bentonite (111) | 0 | 8800 | 6 |
| Inventive 7 | Allyl benzyl dihydrogenated tallow ammonium bentonite (110) | 0 | 7040 | 5 |
| Inventive 8 | Allyl ethanol dihydrogenated tallow ammonium bentonite (108.8) | 0 | 10260 | 7 |
| Inventive 9 | Allyl methyl dihydrogenated tallow ammonium bentonite (109.8) | 0 | 16740 | 14 |
| Inventive 10 | Ethanol methyl dihydrogenated tallow ammonium bentonite (108.2) | 0 | 7140 | 5 |

TABLE IIIA

AROMATIC PIGMENTED SOLVENT SYSTEM

| Ingredients | Generic Name | Manufacturer | Blank (No Thickener) Pounds | Regular Processing (High Shear) Pounds | Low Shear Processing (Post Addition) Pounds |
|---|---|---|---|---|---|
| MILLBASE - ADD IN THE FOLLOWING ORDER | | | | | |
| Duraplex 12-808 | Short oil unmodified alkyd (60% N.V.) | Reichhold Chemical, Inc. | 215 | 215 | 215 |

TABLE IIIA-continued

AROMATIC PIGMENTED SOLVENT SYSTEM

| Ingredients | Generic Name | Manufacturer | Blank (No Thickener) Pounds | Regular Processing (High Shear) Pounds | Low Shear Processing (Post Addition) Pounds |
|---|---|---|---|---|---|
| Xylene | — | Shell Chemical Co. | 146 | 146 | 146 |
| Rheological additive | Dimethyl dihydrogenated tallow ammonium hectorite | NL Industries | — | 10 | — |
| Methanol/Water, 95/5 | — | — | — | 3.3 | — |
| TITANOX 2020 | Rutile Titanium Dioxide | NL Industries, Inc. | 355 | 355 | 355 |
| PEBBLE MILL FOR 16 HOURS ||||||
| LET DOWN - ADD TO PEBBLE MILL IN ORDER SHOWN ||||||
| Duraplex 12-808 | Short oil unmodified alkyd (60% N.V.) | Reichhold Chemical, Inc. | 198 | 198 | 198 |
| Uformite 27-809 | Melamine formaldehyde Resin (50% N.V.) | Reichhold Chemical, Inc. | 177 | 177 | 177 |
| MIX FOR ½ HOUR IN PEBBLE MILL BEFORE CANNING OFF ||||||
| Stir-in Thickener | Rheological Additive | Experimental | — | — | 10 |
| MIX INTO FINISHED BLANK PAINT USING COWLES AT 3000 RPM ||||||
| | | Total | 736 | 749.3 | 746 |

TABLE IIIB

| Example | Rheological Additive (ME Ratio) | Fineness of Grind | Viscosity (cPs) 24 hours | Sag (mils) 24 hours |
|---|---|---|---|---|
| Comparative L | Fumed silica | 3 | 2560 | 12 |
| Comparative M | Benzyl trihydrogenated tallow ammonium bentonite (111.5) | 0 | 760 | 8 |
| Comparative N | Benzyl trihydrogenated tallow ammonium bentonite (117.8) | 1.5 | 700 | 6 |
| Comparative O | Methyl trihydrogenated tallow ammonium bentonite (110.8) | 0 | 1340 | 7 |
| Comparative P | Methyl trihydrogenated tallow ammonium bentonite (116) | 4.0 | 2550 | 16 |
| Comparative Q | Dimethyl dihydrogenated tallow ammonium bentonite (110) | 0 | 420 | 4 |
| Inventive 11 | Allyl trihydrogenated tallow ammonium bentonite (111.8) | 0 | 780 | 7 |
| Inventive 12 | Ethanol trihydrogenated tallow ammonium bentonite (111.8) | 0 | 520 | 4 |
| Inventive 13 | Diallyl dihydrogenated tallow ammonium bentonite (108.4) | 0 | 740 | 8 |
| Inventive 14 | Allyl benzyl dihydrogenated tallow ammonium bentonite (110) | 0 | 700 | 6 |
| Inventive 15 | Allyl ethanol dihydrogenated tallow ammonium bentonite (108.8) | 0 | 880 | 9 |
| Inventive 16 | Allyl methyl dihydrogenated tallow ammonium bentonite (109.8) | 0 | 1300 | 10 |
| Inventive 17 | Ethanol benzyl dihydrogenated tallow ammonium bentonite (110) | 2 | 1030 | 8 |
| Inventive 18 | Ethanol methyl dihydrogenated tallow ammonium bentonite (108.2) | 1 | 830 | 8 |
| Inventive 19 | Triallyl hydrogenated tallow ammonium bentonite (110.6) | 0 | 640 | 8 |
| Inventive 20 | Diallyl methyl hydrogenated tallow ammonium bentonite (108.1) | 0 | 480 | 5 |
| Inventive 21 | Allyl dibenzyl hydrogenated tallow ammonium bentonite (111.8) | 0 | 1550 | 9 |
| Inventive 22 | Allyl diethanol hydrogenated tallow ammonium bentonite (108.1) | 0 | 440 | 5 |
| Inventive 23 | Allyl dimethyl hydrogenated tallow ammonium bentonite (110.3) | 0 | 400 | 4 |
| Inventive 24 | Allyl ethanol benzyl hydrogenated tallow ammonium bentonite (109.8) | 0 | 500 | 5 |
| Inventive 25 | Allyl benzyl methyl hydrogenated tallow ammonium bentonite (108.5) | 0 | 450 | 5 |
| Inventive 26 | Diethanol benzyl hydrogenated tallow ammonium bentonite (111.5) | 0 | 440 | 5 |
| Inventive 27 | Ethanol benzyl methyl hydrogenated tallow ammonium bentonite (109.2) | 0 | 440 | 4 |
| Inventive 28 | Diethanol methyl hydrogenated tallow ammonium bentonite (111.7) | 0 | 450 | 6 |
| Inventive 29 | Ethanol dimethyl hydrogenated tallow ammonium bentonite (108.1) | 0 | 400 | 4 |

TABLE IVA

AROMATIC CLEAR SOLVENT SYSTEM

1. Add 392 grams of the Duraplex 12-808 to an unlined 1 quart can.
2. Stir at 1000 rpm on a 1 hp dispersator with a 1⅝" Hi-Vis Blade.
3. Add 12g of the rheological additive while mixing.
4. Increase speed of mixer blade to 3000 rpm.
5. Check fineness of grind after 15 minutes mixing.
6. Transfer gel to an unlined 1 pint can.
7. Measure 10 rpm Brookfield viscosity within 5 minutes.
9. Recheck viscosity the next day

TABLE IV B

| Example | Rheological Additive (ME Ratio) | Fineness of Grind | Viscosity (cPs) 24 hours | Sag (mils) 24 hours |
|---|---|---|---|---|
| Comparative R | Fumed silica | 0 | 12400 | 18 |
| Comparative S | Benzyl trihydrogenated tallow ammonium bentonite (111.5) | 0 | 20320 | 20 |
| Comparative T | Benzyl trihydrogenated tallow ammonium bentonite (117.8) | 0 | 11600 | 18 |
| Comparative U | Methyl trihydrogenated tallow ammonium bentonite (111) | 7.5 | 20500 | 30 |
| Comparative V | Methyl trihydrogenated tallow ammonium bentonite (116) | 7.5 | 21400 | 30 |
| Comparative W | Dimethyl dihydrogenated tallow ammonium bentonite (110) | 0 | 9620 | 16 |
| Comparative X | Blank | — | 5760 | 12 |
| Inventive 30 | Diallyl dihydrogenated tallow ammonium bentonite (108.4) | 1 | 21200 | 20 |
| Inventive 31 | Allyl benzyl dihydrogenated tallow ammonium bentonite (110) | 0 | 12640 | 20 |
| Inventive 32 | Allyl ethanol dihydrogenated tallow ammonium bentonite (108.8) | 0 | 18960 | 20 |

TABLE IV B-continued

| Example | Rheological Additive (ME Ratio) | Fineness of Grind | Viscosity (cPs) 24 hours | Sag (mils) 24 hours |
|---|---|---|---|---|
| Inventive 33 | Allyl methyl dihydrogenated tallow ammonium bentonite (109.9) | 6 | 25320 | 25 |
| Inventive 34 | Ethanol benzyl dihydrogenated tallow ammonium bentonite (110) | 1 | 21800 | 25 |
| Inventive 35 | Ethanol methyl dihydrogenated tallow ammonium bentonite (108.2) | 0 | 14680 | 20 |
| Inventive 36 | Triallyl hydrogenated tallow ammonium bentonite (110.6) | 0 | 21440 | 20 |
| Inventive 37 | Diallyl methyl hydrogenated tallow ammonium bentonite (108.1) | 0 | 50000 | 20 |
| Inventive 38 | Allyl diethanol hydrogenated tallow ammonium bentonite (108.1) | 0 | 21250 | 18 |
| Inventive 39 | Allyl dimethyl hydrogenated tallow ammonium bentonite (110.3) | 0 | 39000 | 25 |
| Inventive 40 | Allyl ethanol benzyl hydrogenated tallow ammonium bentonite (109.8) | 0 | 40000 | 20 |
| Inventive 41 | Allyl benzyl methyl hydrogenated tallow ammonium bentonite (108.5) | 0 | 8000 | 16 |
| Inventive 42 | Diethanol benzyl hydrogenated tallow ammonium bentonite (111.5) | 0 | 21000 | 16 |
| Inventive 43 | Ethanol benzyl methyl hydrogenated tallow ammonium bentonite (109.2) | 0 | 23000 | 18 |
| Inventive 44 | Diethanol methyl hydrogenated tallow ammonium bentonite (111.7) | 0 | 7600 | 20 |
| Inventive 45 | Ethanol dimethyl hydrogenated tallow ammonium bentonite (108.1) | 0 | 8400 | 20 |

TABLE V A
MODERATELY POLAR PIGMENTED SOLVENT SYSTEM

| INGREDIENTS | GENERIC NAME | MANUFACTURER | LOW SHEAR POST ADDITION (POUNDS) |
|---|---|---|---|
| Toluene | — | — | 119.0 |
| Methyl Ethyl Ketone | — | — | 150.0 |
| 95% 2-Propanol | — | — | 12.5 |
| Isobutyl Acetate | — | — | 292.0 |
| Stir under slow speed using a Cowles dissolver in a 1 gallon paint can. | | | |
| Vinyl VAGN resin | Polyvinyl chloride resin | Union Carbide | 140.0 |
| Sift into the solvent mixture under Cowles agitation. Close the can and roll overnight to complete dissolution of the resin. Transfer to a ball mill. | | | |
| ONCOR M50 (registered trademarks of NL) | Basic Lead Silicochromate | NL Industries, Inc. | 100.4 |
| Indian Red #5098 | Red Iron Oxide | Pfizer | 9.4 |
| Tricresyl Phosphate | — | Stoney-Mueller | 14.5 |
| Epichlorohydrin | — | — | 1.0 |
| Add to the ball mill and ball mill 16 hr. to a Hegman grind of 5 or better. | | | |
| Organophilic Clay | | Experimental | 10.0 |
| Mix into finished blank paint using a Cowles dissolver at 3000 rpm for 15 minutes. | | | |

TABLE V B

| Example | Rheological Additive (ME Ratio) | Fineness of Grind | Viscosity (cPs) 24 hours | Sag (mils) 24 hours |
|---|---|---|---|---|
| Comparative Y | Fumed silica | 4 | 5540 | 35 |
| Comparative Z | Dimethyl benzyl hydrogenated tallow ammonium bentonite (102) | 0 | 4480 | 30 |
| Comparative AA | Methyl benzyl dihydrogenated tallow ammonium bentonite (112) | 0 | 1600 | 20 |
| Inventive 46 | Diallyl dihydrogenated tallow ammonium bentonite (108.4) | 0 | 1420 | 18 |
| Inventive 47 | Allyl methyl dihydrogenated tallow ammonium bentonite (109.9) | 0 | 1600 | 20 |
| Inventive 48 | Ethanol benzyl dihydrogenated tallow ammonium bentonite (110) | 0 | 1300 | 18 |
| Inventive 49 | Triallyl hydrogenated tallow ammonium bentonite (110.6) | 0 | 6000 | 35 |

Another specific embodiment of the present invention involves the formation of non-aqueous fluid systems comprising printing ink compositions.

The dispersion of finely divided pigments, that is, ink coloring material, in organic ink vehicles to produce a material that is suitable as a printing ink is an exceedingly complex art. The type of surface being printed the particular printing press being used, the speed of operation, and the time of drying are all basic factors which determine the necessary working qualities for a satisfactory ink.

The greatly expanded circulation of modern newspapers has brought about the development and use of high speed presses in the printing industry. This has required printing inks which set rapidly. Resin-base systems which can be dried by water, steam or hot air are gradually replacing the conventionally employed drying oils. Modern high speed presses require inks which will set in a matter of seconds rather than minutes.

For high-speed printing, inks must maintain a proper balance of tack, penetration and body control. Too high a degree of tack may cause the paper to tear or the ink to mist at high-press speeds. Ink with insufficient tackiness will not transfer properly in the printing operation. If penetration of the ink is too great, the print becomes visible from the opposite side of the paper, or causes blurring of figures. Poorly controlled penetration may result in smudging after the ink has been supportedly set. An ink must have body to prevent centrifugal throw-off at high-press speeds. In contrast, too viscous an ink will not flow properly from the fountains to the rollers.

These variations and the conditions that are necessary to be met make it mandatory for the ink industry to rely on a large number of formulations. For example, U.S. Pat. No. 2,750,296 discloses a printing ink containing coloring matter dispersed in a vehicle comprising an oil-soluble resinous binder material dissolved in mineral oil, and containing therein a long chain aliphatic amine bentonite containing 34 carbon atoms in the aliphatic chain. In contrast, U.S. Pat. No. 2,754,219 discloses the formation of an anti-misting printing ink prepared by adding to an ink, whose principal vehicle constituent is a hydrocarbon containing an aromatic constituent, a finely divided organic derivative of montmorillonite in which the organic constituent includes a chain of at least 12 carbon atoms. In addition to these United States patents, U.S. Pat. No. 2,739,067 discloses a printing ink containing a modified clay which forms a gel in the organic vehicle and has a substantial gel characteristic therein. The prior art compounds, however, have all suffered from various disadvantages. For example, some require the undesirable use of polar dispersion additives which may react with other ink formulation components eliminating essential ink properties whereas others require numerous shearing actions through a roller mill to produce a viscosity stable material which viscosity will not increase on storage with attendant high-labor costs, and concomitant production shut down.

In contrast to these prior art techniques, U.S. Pat. No. 4,193,806 discloses the preparation of a storage-stable printing ink comprising an organic ink vehicle and an organophilic clay gellant comprising the reaction product of a smectite-type clay having a cation exchange capacity of at least 75 milliequivalents per 100 grams of clay and a methyl benzyl dialkyl ammonium compound or a dibenzyl dialkyl ammonium compound wherein the alkyl groups contain 14 to 22 carbon atoms. The printing inks of this U.S. patent are disclosed as being able to attain full viscosity levels following one pass over a three roll mill in contrast to prior comparative gellants which continue to increase in viscosity. While this patented printing ink has advanced the state of the art to new levels, further advancement and improvement is necessary to eliminate the need to perform a prior high shearing action to attain acceptable viscosity levels.

A printing ink containing a viscosity increasing additive has been unexpectedly discovered comprising an organic ink vehicle having dispersed therein an ink coloring material and an organophilic clay gellant comprising the reaction product of an organic cationic compound and a smectite-type clay having a cation exchange capacity of at least 75 milliequivalents per 100 grams of said clay, wherein said organic cationic compound contains:
(a) a first member selected from the group consisting of a $\alpha,\gamma$-unsaturated alkyl group and a hydroxyalkyl group having 2 to 6 carbon atoms and mixtures thereof,
(b) a second group comprising a long chain alkyl group having 12 to 60 carbon atoms and
(c) a third and fourth member selected from a member of group (a), an aralkyl group, and an alkyl group having 1 to 22 carbon atoms and a mixture thereof; and wherein the amount of said organic cationic compound is from 90 to 140 milliequivalents per 100 grams of said clay, 100% active clay basis.

The printing inks of this invention comprise an organic ink vehicle having dispersed therein an ink coloring material and the novel organophilic clay gellant. The organic ink vehicle comprises a solvent and binder. Conventional solvents such as high boiling hydrocarbon as well as other conventional solvents may be employed. The solvent is preferably a high boiling aliphatic solvent, or mixtures thereof since these are economical to employ and handle to prepare acceptable systems. Conventional binders, such as synthetic or natural resins having film forming properties may be used. These binders also function as a carrier for the pigment. The type of binder used depends on the particular application and accordingly may be selected from drying oil varnish, alkyd resins, polyester vehicles, and urethane alkyds. Ink coloring materials comprise pigments or predispersed pastes. The predispersed pastes may contain a pigment, a vehicle, and solvent. Other additives may be incorporated in the printing ink to modify the ink properties for special applications. These additives may include driers, dispersants, pigment extenders and antioxidants.

The printing ink is prepared in an economical and practical manner by simply incorporating the organophilic clay gellants into a basic ink composition containing an ink coloring material and an organic ink vehicle.

The ink compositions prepared with the compositions of this invention achieve high viscosity levels by merely being stirred into the ink formulation and do not require passage over a three roll mill or use other similar systems to obtain viscosity increases.

The product can be easily dispersed as a rheological additive to provide maximum viscosity build-up through conventional dispersion means in the absence of three roll milling. The organophilic clays of this invention provide an ink composition which, when properly dispersed, will have a particle size fine enough that no filtering or milling will be necessary to prepare a usable formulation.

While a three roll mill may be used to aid in dispersing the ink coloring pigments or materials so that the ink will print satisfactorily on the printing machine, which procedure is commonly required, such passage is not needed to increase viscosity.

A loose three roll mill pass will be necessary in some instances with ink systems where oxidation takes place so that no entrapped air from the dispersion process will cause the formation of small hardened particles of ink.

The invention may also be carried out by adding the organophilic clay gellant to a previously prepared finished printing ink. These inks may be prepared by any usual method such as with colloid mills, roller mills, ball mills, etc. in which the ink pigment material becomes well dispersed in the organic ink vehicle by the high shear used in processing. This dispersion of pigment in the vehicles constitutes a normal ink and has the conventional tendency to mist.

The organophilic clay gellant is employed in amounts sufficient to obtain the desired viscosity value and tack in the printing ink. If necessary, the viscosity may be further controlled by the addition of a viscosity reducing agent, for example, naphthenic oil or solvent. In general, amounts from 0.1% to 15% by weight of the printing ink is sufficient to greatly reduce the misting tendencies of the ink when utilized in high-speed press printing operations with preferred amounts being from 0.5% to 4% and most preferably from 1% to 3% by weight. When the gellant is employed in concentrations less than 0.1% or greater than 10% by weight of the printing ink, the consistency, flow, and other properties affecting the critical characteristic of the ink are seriously impaired, that is, the desired increase in viscosity and tack is not achieved.

The printing inks of the invention may contain conventional ink additives employed in such printing inks. For example, oil-soluble toners utilized to overcome the brownish tone of mineral oil and carbon black pigment may be employed as well as small amounts of waxes or greases to impart special properties to the printing ink.

The printing inks which may be used with the gellants of the present invention include, but are not limited to, heat set or newsprint ink, water or steam set ink, or lithographic printing ink.

Newsprint inks dry mainly by penetration and absorption, although some heat is utilized to speed drying and prevent smudging. By properly controlling viscosity, tack and yield point with such inks, the organophilic clays of the invention acheive proper penetration in an efficient manner without centrifugal throw off or misting.

When the organophilic clays of the invention are employed with other heat set typographic inks, such as high grade inks for periodicals which contain additives such as binders plus solvents, the inks are extremely flexible, non-smudging, print well, and set rapidly at high temperatures.

The use of the gellant in steam or water set inks greatly affects viscosity and tack by producing a characteristic shortness in the ink.

In contrast, lithographic printing inks are very similar in composition to typographic inks, except that the body is somewhat greater, and pigment concentration is higher. The benefits of using the organophilic clays given above apply here also.

The following examples are given to illustrate the invention, but are not deemed to be limiting thereof. All percentages given are based upon weight unless otherwise indicated.

In the examples, the following test procedures were employed:

Dispersion

The test ink was drawn down in both channels of a NPIRI G-1 Grindometer and then checked for fineness of grind (small particles) and scratches. The gauge scale reads from "10" to "0". A reading of 10 corresponds to a depth of one mil and a reading of 0 is zero depth. Samples were drawn down so that a minimum of four separate gauge readings were taken and averaged out. Perfect readings for a test sample would be "0" for both fineness of grind and scratches.

Viscosity

Viscosity was measured using a Thwing-Albert falling rod viscometer at a block temperature of 78° F. Air was removed from the ink by simple spatulation and then a rod was completely coated with the ink sample. Three weights were used for obtaining fall time values: 700, 500, 200 grams. These weights were repeated and the data run on a Hewlett-Packard computer to obtain the predicted Bingham viscosity in poise at 1000 sec.$^{-1}$. The viscosity value chosen for the tables was taken using the data which contained the smallest root mean square deviation from a straight line calculated from the Bingham Equation $$f_B = T - D_B M_B$$

which is the intercept on the shear stress axis when the shear rate is zero.

$f_B$ is the yield value.
T is the shear stress.
$D_B$ is the shear rate.
$M_B$ is the viscosity.

EXAMPLE

A web offset, heatset base red ink formulation was prepared with the ingredients set forth in Table VI and passed once over a three roll mill to obtain a fine ink dispersion. The rheological additive was then added slowly to the base ink under the least amount of agitation possible to prevent spill out. Dispersion was then obtained at 3000 rpm on a 0.5 H.P. Premier Dispersator Unit using a Cowles blade. Proper speed was maintained for 15 minutes. Measurements of viscosity were conducted following dispersion and after 24 hours.

Separate ink samples were treated with different organophilic clay derivatives and comparative material at a 2% by weight level.

Comparative Run BB employed fine particle size silica identified commercially as Aerosil R972 (DeGussa Inc.). Comparative CC employed an organophilic clay identified as benzyl trihydrogenated tallow ammonium bentonite. The inventive compositions are set forth in Table VII.

The data demonstrates that the inventive material prepared from the inventive quarternary compound achieved good dispersion and efficiency under low shear mixing conditions.

TABLE VI

| WEB OFFET, HEATSET BASE INK FORMULATION - RED | | | |
|---|---|---|---|
| Component | Supplier | Generic Name | % of Formulation |
| Lo-Cal A-7-T | Lawter Chemicals | Heat Set Varnish | 51 |
| Heat Set Microwax Compound C-219 | Dyall* | | 6 |
| Heat Set Fischer-Tropsch Wax C-188 | Dyall* | Heat Set Fischer-Tropsch Wax | 4 |
| Lithol Rubine 66-PP-0229 | BASF-Wyandotte | Heat Set, pre-dispersed red paste | 31 |
| Ionol (15% w/w in Magiesol 47) | Shell Chemical | Antioxidant | 2 |
| Magiesol 47 | Magie Bros. | High boiling hydrocarbon solvent (median boiling point 470° F.) | 4 |
| | | Base Total | 98.0% |
| Rheological Additive | | | 2.0 |
| | | Final Mix Total | 100.0% |

*Dyall is a subsidiary of Lawter Chemicals

TABLE VII

| Example | Rheological Additive (ME Ratio) | Dispersion Fineness of Grind/Time | Dispersion Scratches/Time | Viscosity (poise) Initial | Viscosity (poise) 24 Hours |
|---|---|---|---|---|---|
| Comparative BB | Fumed silica | 10/15 | 0/15 | 80 | 84 |
| Comparative CC | Benzyl trihydrogenated tallow ammonium bentonite (114) | 0/5 | 0/5 | 86 | 88 |
| Inventive 50 | Allyl trihydrogenated tallow ammonium bentonite (116.1) | 0/10 | 0/10 | 87 | 87 |
| Inventive 51 | Diallyl dihydrogenated tallow ammonium bentonite (108.4) | 10/20 | 1(4-0), 1(2-0) | 95 | 94 |
| Inventive 52 | Allyl benzyl dihydrogenated tallow ammonium bentonite (110) | 10/20 | 0/20 | 99 | 98 |
| Inventive 53 | Allyl ethanol dihydrogenated tallow ammonium bentonite (108.8) | 10/20 | 1(3-0), 2(2-0) | 92 | 91 |
| Inventive 54 | Allyl methyl dihydrogenated tallow ammonium bentonite (108.8) | 0/10 | 0/10 | 102 | 100 |
| Inventive 55 | Ethanol benzyl dihydrogenated tallow ammonium bentonite (110) | 10/15 | 2(2-0)/15 | 97 | 96 |
| Inventive 56 | Ethanol methyl dihydrogenated tallow ammonium bentonite (108.2) | 10/20 | 1(3-0)/20 | 99 | 89 |

Another specific embodiment of the present invention involves the formation of non-aqeuous fluid systems comprising grease formulations.

In the past, lubricating greases have comprised for the most part, hydrocarbon oils thickened with a soap. In recent years a number of non-soap thickening agents have been introduced which offer considerable advantages over the soaps theretofore used. Also, the range of usable lubricating vehicles has been extended to include liquids other than hydrocarbon oils such as various esters, silicone oils, and the like. Greases of the newer types just mentioned are generally known as non-soap-thickened greases. An important sub-group thereof comprises those thickened with clay minerals, such as montmorillonite and hectorite, which have been made organophilic by complexing with a long-chain compound. Greases of this type are described in Jordan Pat. No. 2,531,440 and in various articles in the technical literature, such as that entitled "BENTONE Greases," by C. M. Finlayson et al., The Institute Spokesman, May 1950, pp. 13-23; and in chapter 17 of the book, Lubricating Greases, by C. J. Boner, New York, 1954. Such greases, in common with other greases, may contain further additives such as anti-corrosion additives, extreme pressure additives, finely divided solid lubricants, fluorescence additives, and the like.

It has been found that in the general case, greases of the type described are not always ideal in their behavior upon prolonged working at elevated temperatures. Such action may bring about a loss of consistency, evident in the laboratory tests as an increase in penetration. This may not always be of such a nature that it renders the grease inoperative, but it is clearly desirable to have a grease which retains its physical characteristics unchanged throughout use.

It has been unexpectedly discovered that use of the organophilic clays of this invention are capable of preparing a lubricating grease that has increased stability on prolonged working at high temperatures and is free from deleterious effects on other grease properties, such as corrosion, response to water contamination and the like.

The lubricating oil forming the base of the grease to which the invention is applicable may be any of those generally employed in the manufacture of lubricating greases wherein the thickener is an organophilic clay. This covers, indeed, the full and wide range of liquid lubricants broadly, and included, by way of example but not by way of limitation, lubricating oils obtained from petroleum, sometimes called mineral lubricating oils; lubricating oils derived from petroleum by various polymerization and reforming processes, such as the Fischer-Tropsch, Synthol, Synthine, and related processes; lubricating oils produced by the Bergius process as applied to the hydrogenation of coal, peat, and the like, and of asphalts, petroleum residues, and the like; synthetic lubricants produced by the volatilization process, for example, from fatty oils, petroleum hydrocarbons and the like; the so-called ester lubricants, which may be alkyl esters of organic acids, such as dioctylphthalate, ethyl ricinoleate, and the like, or which may be alkyl or alkylaryl esters such as tricresyl phosphate; synthetic lubricants made by the polymerization of alkylene oxides and glycols such as pentamethylene glycol; and the silicone polymers known generally as the silicone oils.

The organophilic clay reaction product may be added at any desired stage of preparation of the grease composition. Since the clay reaction products do not require the presence of a polar activator, prior dispersion with conventional activators is not necessary. Generally, amounts of thickener ranging from 0.5 to 10% by weight of grease have been found effective.

In addition to the foregoing additives used in preparing the grease formulation, it has been found that the inclusion of asbestos augments the thickening effect of the organophilic clay.

The asbestos which may be included in the greases to which the invention is applied may be any chrysotile or tremolite which is reasonably free of non-asbestos dross and which has been mechanically or chemically treated so as to separate the fibers to such an extent that individual fibers are not readily seen by the unaided eye. Many procedures are available for carrying this out and need not be described in detail here. Reference may be made to the book *Asbestos Fundamentals*, by Berger and Oesper, New York, 1963.

When asbestos is used in accordance with the invention, it is convenient to make a dry mixture by blending of the organophilic clay, and the asbestos. Considering the relative thickening and stabilizing effects of the organophilic clays and of asbestos, a practical range of weight of asbestos to organophilic clay in such a dry mix is from about one-half to twice the amount of said organophilic clay.

It is also possible to include an anti-corrosive agent in the grease with the organophilic clay, such as sodium nitrite and similar additives. Generally speaking, when sodium nitrite is so used, a practical range of concentration thereof is from about 0.25 to about 1.0 times the weight of the organophilic clay used. Again, where a dry mixture lacking merely the lubricating oil is prepared in advance, it is quite practical to include any sodium nitrite contemplated as one of the components thereof. In such a case, it will, of course, bear the same weight ratio to the organophilic clay as has been just stated for the grease.

The following examples are given to illustrate this aspect of the invention, but are not deemed to be limiting thereof. All percentages given are based upon weight unless otherwise indicated.

EXAMPLE

In the examples, various types of the organophilic clay gellants prepared were evaluated as grease thickeners at a concentration of 6% by weight in the conventionally refined oil in the presence of 0.4% water. The greases were prepared by mixing the gellant, oil and water together for 30 minutes using a drill press equipped with pitched sweep blades rotating at 450 rpm. The resulting batch was then milled through a "Tri-Homo" disperser with a rotor to stator clearance of 0.001 inch. The ASTM penetrations of the greases, after setting overnight, were obtained after working the greases 60 and 10,000 strokes in an ASTM motorized grease worker assembly. The data obtained are given in Table VIII. Conventional comparative gellants were also evaluated in a conventional heated grease preparation process utilizing 2% by weight acetone as a polar organic dispersant for the gellant. The greases were prepared by mixing the gellant, oil and acetone together for 30 minutes, heating to 250° F. (121° C.) with continued mixing to drive off the acetone, cooling to 180° F. (82° C.) and adding 0.1% water with continued mixing, and milling as above. The data obtained for these greases, which are not an illustration of this invention are compared with the data for the greases in the table since these greases have the same composition.

The conventionally refined oil had the following properties:

|  | Conventionally Refined |
|---|---|
| Gravity, °API at 60F. | 20 |
| Viscosity, SUS at 100F. | 500 |
| Viscosity, SUS at 210F. | 53 |
| Viscosity Index | 12 |
| Index of Refraction | 1.5085 |
| Flash Point, °F. | 390 |
| Pour Point, °F. | −5 |

The data indicates that the organophilic clays containing an amount of inventive thickener were very efficient thickeners for this oil at ambient temperatures using only a small modicum of water as the dispersant. The data also indicate that the organophilic clays disperse readily in the absence of a polar organic dispersant to produce greases having a penetration which is equivalent to that obtained for the greases prepared with the dispersant.

employed for joining the surfaces, of or filling spaces between layers of glass and metal, and bonding glass to glass, metal to metal, metal to glass as well as a variety of other substrates. They are also widely used in the manufacture of automobiles for the purpose of joining metal parts, filling holes and drip ports and the like.

A variety of sealant formulations are based upon vinyl chloride polymers or resins and depending upon the particular sealant formulation they are commonly referred to a plastisols, plastigels, organosols and organogels. While these formulations have been generally effective as sealants, the usual vinyl chloride resin sealant has exhibited several undesirable properties when prepared with convention rheological modifiers, such as finely ground asbestos, silica aerogels and organophilic bentonites. For example, several disadvantages include difficulty in controlling viscosity; toxic disposal problems, especially when asbestos is used; poor sag resistance; and product degradation during fusion and plasticizer migration, especially when conventional organophilic bentonites have been used.

It has been unexpectedly found that the novel compositions recited herein are capable of preparing a sealant composition having regulatable yet desirable rheological properties and therefore enable use of such sealants for essentially any purpose for which vinyl chloride sealants have been employed to date without the toxic waste disposal difficulties and product degradation characteristics associated with the prior art materials. The novel sealing compositions comprise a vinyl chloride resin, a plasticizer for the resin and the improvement therein comprising from about 0.1% to about 10% by weight of a reaction product as herein before described being prepared from an organic cationic compound and a smectite-type clay having a cation exchange capacity of at least 75 milliequivalents per 100 grams of said clay, wherein said organic cationic compound contains:

(a) a first member selected from the group consisting of a $\beta$, $\gamma$-unsaturated alkyl group and a hydroxyalkyl group having 2 to 6 carbon atoms and mixtures thereof, (b) a second group comprising a long chain alkyl group having 12 to 60 carbon atoms and (c) a third and fourth member selected from a member of group (a), an aralkyl group, and an aklyl group having 1 to 22 carbon atoms and a mixture thereof; and wherein the amount of said organic cationic compound is from 90 to 140 milliequivalents per 100 grams of said clay, 100% active clay basis.

The terms "vinyl chloride polymer or resins" and "polyvinyl chloride" as used herein are generally emul-

TABLE VIII

| Example | Thickener (ME Ratio) | Consistency 0 | 60 | 10,000 |
|---|---|---|---|---|
| Comparative DD | Methyl benzyl dihydrogenated tallow ammonium bentonite (113.6) | 297 | 346 | 384 |
| Comparative EE | Dimethyl dihydrogenated tallow ammonium bentonite (95.4) plus activator | 238 | 253 | 273 |
| Inventive 57 | Allyl ethanol dihydrogenated tallow ammonium bentonite (110.1) | 285 | 338 | 428 |
| Inventive 58 | Allyl ethanol dihydrogenated tallow ammonium bentonite (118.9) | 290 | 350 | 442 |
| Inventive 59 | Allyl methyl dihydrogenated tallow ammonium bentonite (109.0) | 272 | 322 | 390 |
| Inventive 60 | Allyl methyl dihydrogenated tallow ammonium bentonite (118.0) | 295 | 348 | 420 |
| Inventive 61 | Allyl methyl dihydrogenated tallow ammonium bentonite (119.5) | 292 | 346 | 415 |

Yet another specific embodiment of the present invention involves the preparation of a vinyl based sealing composition. Broadly, a "sealant" is a material which serves to keep air and water from contacting a substrate to which the material is applied. Typically, sealants are sion grade polyvinyl chloride resins having molecular weights of more than about 10,000 and average particle sizes of less than about 10 microns. These terms however are inclusive of not only polyvinyl chloride homopolymers of all types, but also of copolymers of vinyl chloride in a major portion such as copolymers of vinyl chloride copolymerized with less than 50% by weight of an ethylenically unsaturated comonomer copolymerizable therewith. Ethylenically unsaturated comonomers copolymerizable with vinyl chloride include vinyl acetate, vinylidene chloride, maleic or fumaric acid esters, styrene and acrylonitrile. Minor portions of other synthetic resins such as chlorinated polyethylene, and copolymers of acrylonitrile, butadiene and styrene may be included.

Any of the usual plasticizers for vinyl pastes may be employed. Particularly desirable materials are the phthalate plasticizers. Illustrative plasticizers include dialkyl phthalates such as dioctyl phthalate (i.e. di-2-ethylhexyl phthalate) and octyl decyl phthalate; alkyl phthalyl alkyl glycolates, such as ethyl phthalyl ethyl glycolate and butyl phthalyl glycolate; dialkyl esters of alkane dicarboxylic acids, such as diisobutyl adipate, di-2-ethylhexyl adipate and dibutyl sebacate, acetyl trialkyl citrates, such as acetyl tributyl citrate, and trialkyl and triaryl phosphates, such as trioctyl phosphate, 2-ethylhexyl diphenyl phosphate and tricresyl phosphate. Other useful plasticizers include alkyl esters of fatty acids such as octyl stearate; epoxidized triglycerides such as epoxidized soybean oil and polymeric polyester plasticizers such as polymeric glycol adipate. White oil may also be used as a plasticizer. The preferred plasticizers are di-2-ethylhexyl phthalate and diisodecyl phthalate. Plasticizers may be used at a level from about 50 to about 300 parts per 100 parts resin and preferably from about 70 to 200 parts per 100 parts resins.

Other conventional additives may also be employed such as fillers, stabilizers and antioxidants. A filler composition primarily functions as a sequestering agent by sequestering any water present in the formulation. Representative materials include barium sulfate with either talc or mica. Other fillers that may be incorporated into the sealing composition include diatomaceous earth, magnesium silicate, calcium silicate, calcium sulfate, titanium dioxide, and zinc carbonate. Calcium carbonate coated with calcium stearate may also be used as a filler. The fillers may be included in amounts of about 0 to 200 parts per 100 parts resin.

Useful stabilizers employed in the prior art include zinc, calcium and aluminum stearates. Other stabilizers include zinc octoate, and tin octoate. Preferably a commercially available calcium-zinc stearate is used along with epoxidized soybean oil. Stabilizers may be included in the composition at amounts of moderate levels, preferably 0 to 100 parts and most preferably 2 to 50 parts per 100 parts resin.

The sealant compositions may be prepared in any conventional manner, such as in blending equipment normally employed in the manufacture of viscous materials. Because the rheological additive of this invention may be incorporated into the sealant composition without the need for high shearing equipment, conventional blending is adequate without the need for high speed shear mixers such as a Cowles mixer or a Waring Blendor as required with normal organophilic clay compounds. In this regard blending may be effected in a planetary mixer, a conventional dough kneader, a paddle-type mixer, an extruder, a Banbury mixer and roller mills.

The order of addition of the ingredients is not critical to practice the invention. For example, the rheological additive may be dispersed in the plasticizer prior to effecting admixture with the resin or it may be incorporated simultaneously with or independent from the addition of the remaining components.

The sealant formulations may be in the form of a plastisol, plastigel, organosol or an organogel. Therefore, conventional volatile liquids may be employed to prepare the sealant formulation.

The following examples are given to illustrate this aspect of the invention, but are not deemed to be limiting thereof. All percentages given are based on weight unless otherwise indicated.

EXAMPLE

In the Examples the following test procedures were employed.

Slump Test

Using a stainless steel spatula, a slump channel measuring 6 inches × ¾ inch × ½ inch is filled with a sealant (plastisol) formulation (normally 55 grams sealant). Once filled, the channel is positioned vertically on a 2 inch extender surface for one hour at 25° C. The slump is recorded as the distance in millimeters the plastisol moves down the extended surface.

Discoloration

The plastisol formulation is added to an aluminum container measuring 2¼ inches diameter by 11/16 inches deep. A spatula is then used to smooth the surface of the plastisol and the dish placed in a forced air oven at 350° F. for 15 minutes. Once cooled to room temperature, the color of the plastisol is noted.

The plastisol sealant is prepared by mixing the ingredients set forth below in the order listed. This procedure is a conventional means adopted for use in this invention.

PVC Plastisol Sealant

Diisodecyl phthalate: 100 parts
PVC resin, Firestone FPC-6338: 100
Mix until the resin is dispersed fully on dough or similar mixer and add the following while mixing:
CaCO$_3$, Camel-wite: 160
Stabilizer, TRIBASE: 4
Plasticizer, Kodaflex PA-5: 26
Rheological Additive: 10

TABLE IX

| Example | Rheological Additive (ME Ratio) | Fineness of Grind | Viscosity (cPs) 24 hours | Slump Test | Discoloration |
|---|---|---|---|---|---|
| Comparative FF | Fumed silica | 1.0 | 5200 | 21 | |
| Comparative GG | Benzyl dimethyl hydrogenated tallow ammonium bentonite (106.7) | 0 | 560 | >50 | Moderate to heavy |
| Comparative HH | Methyl benzyl dihydrogenated tallow ammonium bentonite (112) | 2.0 | 640 | 2 | Heavy |
| Inventive 62 | Diallyl dihydrogenated tallow ammonium bentonite (108.4) | 1.0 | 720 | 0 | Moderate |
| Inventive 63 | Allyl benzyl dihydrogenated tallow ammonium bentonite (110) | 0 | 760 | 0 | Slight |

TABLE IX-continued

| Example | Rheological Additive (ME Ratio) | Fineness of Grind | Viscosity (cPs) 24 hours | Slump Test | Discoloration |
|---|---|---|---|---|---|
| Inventive 64 | Allyl methyl dihydrogenated tallow ammonium bentonite (109.8) | 3.5 | 1050 | 0 | Heavy |
| Inventive 65 | Ethanol benzyl dihydrogenated tallow ammonium bentonite (110) | 0 | 600 | 0 | Slight |
| Inventive 66 | Ethanol methyl dihydrogenated tallow ammonium bentonite (108.2) | — | — | 0 | Very slight |
| Inventive 67 | Triallyl hydrogenated tallow ammonium bentonite (110.2) | 1.0 | 1040 | 0 | Heavy |

The invention being thus described, it will be obvious that the same may be varied in many ways. Such variations are not to be regarded as a departure from the spirity and scope of the invention and all such modifications are intended to be included within the scope of the following claims.

We claim:

1. A non-aqueous fluid system which comprises: a non-aqueous fluid composition and an organophilic clay rheological composition which is the reaction product of an organic cationic quaternary ammonium compound and a smectite-type clay having a cation exchange capacity of at least 75 milliequivalents per 100 grams of said clay, wherein said organic cationic quaternary ammonium compound has the positive charge on a single atom and contains
   (a) a first member selected from the group consisting of a $\beta,\gamma$-unsaturated alkyl group, a hydroxyalkyl group having 2 to 6 carbon atoms and mixtures thereof,
   (b) a second member comprising a long chain alkyl group having 12 to 60 carbon atoms and
   (c) a third and fourth member selected from a member of group (a), an aralkyl group, an alkyl group having 1 to 22 carbon atoms and a mixture thereof; and wherein the amount of said organic cationic quaternary ammonium compound is from 90 to 140 milliequivalents per 100 grams of said clay, 100% active clay basis.

2. The composition of claim 1 wherein the smectite-type clay is selected from the group consisting of hectorite and sodium bentonite.

3. The composition of claim 1 wherein the $\beta,\gamma$-unsaturated alkyl group is selected from an unsubstituted and substituted group consisting of cyclic groups, acyclic alkyl groups having less than 7 carbon atoms, acyclic alkyl groups substituted with aromatic groups, and aromatic groups substituted with aliphatic groups.

4. The composition of claim 1 wherein the hydroxyalkyl group is selected from substituted and unsubstituted groups consisting of cyclic groups and aliphatic groups having 2 to 6 carbon atoms with the hydroxyl substitution on $C_2$ to $C_6$.

5. The composition of claim 1 wherein the long chain alkyl group of member (b) has from 12 to 22 carbon atoms.

6. The composition of claim 5 wherein the long chain alkyl group is a long chain fatty acid group.

7. The composition of claim 1 wherein the amount of said organic cationic quaternary ammonium compound is from 100 to 130 milliequivalents per 100 grams of said clay, 100% active clay basis.

8. The non-aqueous fluid system of claim 1 wherein said organophilic clay composition comprises from 0.1% to 15% by weight of said non-aqueous fluid system.

9. The non-aqueous fluid system of claim 1 wherein said organophilic clay composition comprises from 0.3% to 5.0% by weight of said non-aqueous fluid system.

10. A non-aqueous fluid system, which comprises: a non-aqueous fluid composition and an organophilic clay which is the reaction product of an organic cationic compound and a smectite-type clay having a cation exchange capacity of at least 75 milliequivalents per 100 grams of said clay, wherein said organic cationic compound has the positive charge on a single atom and has the general formula:

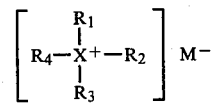

wherein $R_1$ is selected from the group consisting of a $\beta,\gamma$-unsaturated alkyl group, a hydroxyalkyl group having 2 to 6 carbon atoms and mixtures thereof; $R_2$ is a long chain alkyl group having 12 to 60 carbon atoms; $R_3$ and $R_4$ are selected from the group consisting of an $R_1$ group, an aralkyl group, an alkyl group having from 1 to 22 carbon atoms and mixtures thereof; X is nitrogen; and $M^-$ is selected from the group consisting of $Cl^-$, $Br^-$, $NO_2^-$, $OH^-$ and $C_2H_3O_2^-$, and wherein the amount of said organic cationic compound is from 90 to 140 milliequivalents per 100 grams of said clay, 100% active clay basis.

11. A paint composition comprising an organic liquid film-forming vehicle, finely divided pigment dispersed in said vehicle, and a rheological additive comprising the reaction product of an organic cationic quaternary ammonium compound and a smectite-type clay having a cation exchange capacity of at least 75 milliequivalents per 100 grams of said clay, wherein said organic cationic quaternary ammonium compound has the positive charge on a single atom and contains
   (a) a first member selected from the group consisting of a $\beta,\gamma$-unsaturated alkyl group, a hydroxyalkyl group having 2 to 6 carbon atoms and mixtures thereof,
   (b) a second member comprising a long chain alkyl group having 12 to 60 carbon atoms and
   (c) a third and fourth member selected from a member of group (a), an aralkyl group, an alkyl group having 1 to 22 carbon atoms and a mixture thereof; and wherein the amount of said organic cationic quaternary ammonium compound is from 90 to 140 milliequivalents per 100 grams of said clay, 100% active clay basis, said composition being substantially water-free.

12. The paint composition of claim 11 wherein said reaction product comprises from 0.25% to 10% by weight of said paint composition.

13. The paint composition of claim 11 wherein the smectite-type clay is selected from the group consisting of hectorite and sodium bentonite.